US008640533B2

(12) United States Patent
Andersen

(10) Patent No.: US 8,640,533 B2
(45) Date of Patent: Feb. 4, 2014

(54) VEHICLE BRAKE TESTING DEVICE AND A METHOD OF TESTING A VEHICLE BRAKE

(75) Inventor: Helge Andersen, Arendal (NO)

(73) Assignee: Kombimatic AS, Grimstad (NO)

( * ) Notice: Subject to any disclaimer, the term of this patent is extended or adjusted under 35 U.S.C. 154(b) by 0 days.

(21) Appl. No.: 13/634,252

(22) PCT Filed: Mar. 23, 2011

(86) PCT No.: PCT/EP2011/054417
§ 371 (c)(1),
(2), (4) Date: Sep. 12, 2012

(87) PCT Pub. No.: WO2011/117281
PCT Pub. Date: Sep. 29, 2011

(65) Prior Publication Data
US 2013/0008245 A1 Jan. 10, 2013

(30) Foreign Application Priority Data
Mar. 26, 2010 (EP) .................................... 10157993

(51) Int. Cl.
*G01M 17/007* (2006.01)
(52) U.S. Cl.
USPC .......................................................... 73/129
(58) Field of Classification Search
USPC .......................................... 73/121, 128, 129
See application file for complete search history.

(56) References Cited

U.S. PATENT DOCUMENTS

| 5,406,837 | A | * | 4/1995 | Britt | 73/121 |
| 5,433,296 | A | * | 7/1995 | Webberley | 188/1.11 L |
| 5,488,859 | A | * | 2/1996 | Britt | 73/121 |
| 5,668,314 | A | * | 9/1997 | Jones | 73/129 |
| 6,817,234 | B1 | | 11/2004 | Maresko | |
| 6,971,724 | B1 | | 12/2005 | Maresko | |
| 8,127,600 | B2 | * | 3/2012 | Olson | 73/121 |
| 2007/0044551 | A1 | * | 3/2007 | Fogelstrom | 73/121 |

FOREIGN PATENT DOCUMENTS

| DE | 2613663 | 10/1977 |
| DE | 19745581 | 4/1999 |
| EP | 1785325 | 5/2007 |
| EP | 1923286 | 5/2008 |

OTHER PUBLICATIONS

ISR of Jun. 27, 2011.

* cited by examiner

*Primary Examiner* — Eric S McCall
(74) *Attorney, Agent, or Firm* — Christian D. Abel

(57) ABSTRACT

A device (1) for testing pneumatically operated brakes of a first vehicle (22) and of a second vehicle (23) being connected and having interconnected brake systems. A device supply line (3b) and a device control line (4b) are arranged for connection to respective corresponding supply and control lines (3a, 3c, 4a, 4c) in the vehicles such that the device (1) is fluidly connected into and between the brake system of the first vehicle (22) and the brake system of the second vehicle (23). A method of activating the brakes (5) of a trailer unit (23) which is connected to a tractor unit (22), without activating the brakes of the tractor unit (22), provides braking action by employing the device (1), and includes remotely activating the first valve means (9) in order to provide braking action.

15 Claims, 3 Drawing Sheets

VEHICLE BRAKE TESTING DEVICE AND A METHOD OF TESTING A VEHICLE BRAKE

FIELD OF THE INVENTION

The invention is related to the field of pneumatically operated brake systems on vehicles. In particular, but not exclusively, the invention concerns a device for testing the pneumatic braking systems of a tractor-trailer unit and a method of activating such device, according to the introduction to claims 1, 8 and 12.

BACKGROUND OF THE INVENTION

The braking systems of heavy vehicles are normally pneumatically operated. In general, such pneumatic braking systems comprise a compressor for pressurizing air, and two lines between the compressed air reservoir and the brakes. A first line, the so-called supply line, pressurises the braking system. In the event that the supply line is disconnected or severed, or air pressure for other reasons is released from the supply line, the vehicle's brakes are designed to engage automatically. A second line, the so-called control line (also referred to as a pilot line), controls the air pressure acting on the respective brakes and operates the mechanical parts in the brake. The control line pressure is controlled by the brake pedal valve. When the driver operates the brake pedal in the driver's cabin, pressure in the control line will increase, and act on valves in the braking system of the trailer to activate the brakes controllably and in proportion to the force exerted on the brake pedal.

In a tractor-trailer unit (e.g. a lorry or similar, pulling a trailer), the trailer is also equipped with a pneumatically operated braking system. The pneumatic braking system of a trailer also comprises a supply line and a control line, both of which are connected to the tractor's supply line and control line via a connector. (The connector is commonly of a standardised type, well known in the industry, for example "duomatic" or "glad-hands"). Thus, when the driver operates the brake pedal, both the tractor's brakes and the trailer's brakes are operated simultaneously. At the same time, brake lights are lit both on the rear of the tractor and the rear of the trailer.

In order to gain knowledge of how much braking power the tractor-trailer unit develops, one needs to know the pressure of the air which is sent from the brake pedal to the individual wheel brakes. This pressure may be measured at i.a. the connection between the tractor and the trailer.

Tractor-trailer units must comply with rigorous technical requirements, in order to be considered safe for operation on public roads. One such technical requirement is the operability and quality of the brakes (e.g. the mechanical parts, the pneumatics operating the mechanical parts, and associated control systems). Even minor deficiencies in the brakes may lead to reduction in braking power, thus increasing the stopping distance beyond acceptable and mandatory values. A technical test of the brakes in a tractor-trailer unit is normally performed by means of braking tests in a test stand or by measuring the deceleration when braking on the open road or on a test track. Such deceleration is measured in a known fashion, e.g. by accelerometers installed on the vehicle.

It is normally a simple task to control the brakes on the tractor (e.g. lorry, truck) by itself, by e.g. disconnecting the trailer and conducting deceleration measurements when applying the brakes. Performing brake tests on a trailer, however—be it a conventional trailer or a semi-trailer, is a much more complex task with today's technology. State-of-the-art braking systems include automatic and electronic systems (ABS, EBS) whereby the braking action on the trailer is adapted to the braking action on the tractor, and vice versa. Effecting the brakes on the trailer only (and not the tractor) while the tractor-trailer unit is moving (i.e. regular driving mode on the road), has proven difficult without considerable modifications to the vehicles and/or the assistance of additional personnel. There thus is a long felt need for an efficient and simple device and method of testing trailer and tractor units independently of one another, while the tractor-trailer unit is driving.

The state of the art includes GB 2 361 975 A, which describes a device for testing the electrical and pneumatic systems of a stand-alone and stationary trailer unit, comprising input lines for supply of compressed air and electrical power, output means adapted to transfer pneumatic pressure and electrical power to a trailer unit, and a control means, wherein a handheld remote control unit is provided. The handheld remote control unit is adapted to transmit signals to a receiver in the device, and the control means are adapted to be actuated by said signals relayed by said receiver means to control said output means in response thereto.

The state of the art also includes U.S. Pat. No. 6,530,261 B1, describing an apparatus (and an associated method) for testing air brakes of stand-alone and stationary trailers, and including a portable air-brake governing or actuation system and a hand-held control pendant, operating off an independent compressed air supply. Without the coupling of, and connections to, a tractor, the air brakes of a trailer can be applied and released, and held in a charged mode for a period of time during which any loss of air pressure can be monitored.

The state of the art thus describes testing of the pneumatic lines of brake systems in a static state, i.e. while the trailer is stationary.

The present applicant has devised and embodied this invention to overcome these shortcomings and to obtain further advantages.

SUMMARY OF THE INVENTION

The invention is set forth and characterized in the main claims, while the dependent claims describe other characteristics of the invention.

The invented device for testing pneumatically operated brakes of a first vehicle and of a second vehicle, said vehicles being connected and having interconnected brake systems, is characterized by
 a device supply line and a device control line for connection to respective corresponding supply and control lines in the vehicles such that the device is fluidly connected into and between the brake system of the first vehicle and the brake system of the second vehicle;
 a first valve means operable for temporarily and releasably connecting the device supply line to the device control line, whereby braking action may be effected on the second vehicle via a second vehicle control line, independently of the braking action on the first vehicle; and
 a second valve means operable for temporarily and releasably blocking the device control line, whereby braking action may be effected on the first vehicle without effecting braking action on the second vehicle.

In one embodiment, the device further comprises a shuttle valve for connecting the device supply line to the device control line and closing the device control line off from the first vehicle control line, when the first valve means is operated, in order to prevent fluid flowing through the first valve means (9) from entering the tractor (22) brake system.

In one embodiment, the device comprises pressure control means fluidly connected between the first valve means and the device control line, whereby a braking pressure may be set at a pre-determined level before operating the first valve means. A pressure gauge may be fluidly connected between the pressure control means and the shuttle valve.

In one embodiment, the device comprises a transceiver-control unit for operating parts and equipment within the device, said transceiver-control unit being configured to communicate with a remote control unit, whereby the device may be controlled by means of the remote control unit. The remote control unit preferably comprises valve control buttons, a data processor, data input means, data display means and a data storage medium.

The supply line is preferably fluidly connected to a pressurised reservoir in the first vehicle, and the control line is preferably connected to a brake valve in the first vehicle.

The invented method of activating the brakes of a trailer unit which is connected to a tractor unit, without activating the brakes of the tractor unit, and by means of the invented device, is characterized by activating the first valve means in order to provide braking action. Preferably, the first valve means is remotely activated by the driver of the tractor unit while the tractor-trailer unit is driving on a roadway. The first valve means is preferably activated until the tractor-trailer unit comes to a halt, and the second valve means and the tractor foot brake valve are not activated.

The invented method of activating the brakes of a tractor unit which is connected to a trailer unit, without activating the brakes of the trailer unit, by means of the invented device is characterized by blocking the device control line by activating the second valve means and also activating the tractor foot brake valve in order to provide braking action. Preferably, the second valve means is remotely activated by the driver of the tractor unit while the tractor-trailer unit is driving on a roadway. The second valve means is preferably activated until the tractor-trailer unit comes to a halt, and the first valve means is not activated.

The invented device and method facilitate a dynamic and selective testing of the brake systems and braking action of the tractor and/or trailer units. The tests may be performed while driving, may be conducted by one person (the driver) and requires no modification of the brake systems installed in the vehicles. The invented device and method provide safe and reliable testing, and allow the testing of the entire brake system, not just the pneumatics. The integrity of the brake system is preserved when the invented device is inactive.

BRIEF DESCRIPTION OF THE DRAWINGS

These and other characteristics of the invention will be clear from the following description of a preferential form of embodiment, given as a non-restrictive example, with reference to the attached drawings, wherein.

DETAILED DESCRIPTION OF A PREFERENTIAL EMBODIMENT

System Description

Figure 5:
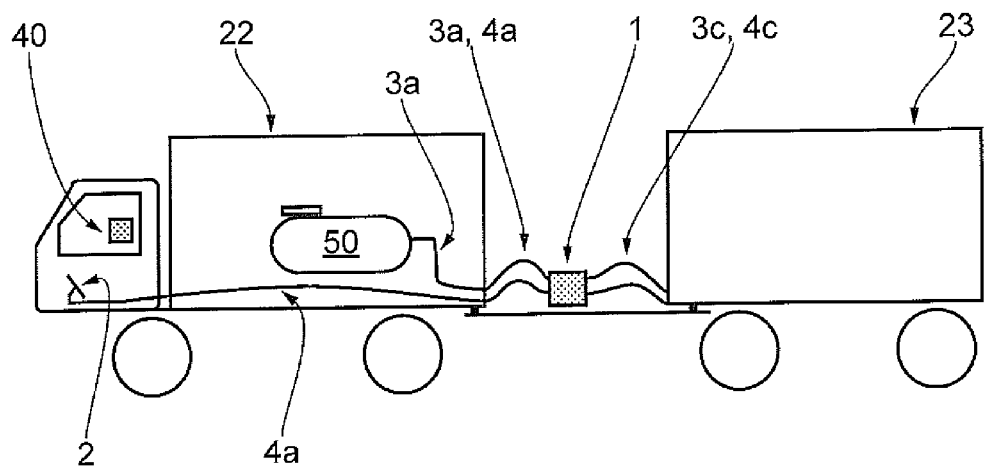
FIG. 5 is a schematic illustration of the device according to the invention, connected in the pneumatic brake system lines between a tractor and trailer.

Referring initially to FIG. 5, the invented testing device 1 is fluidly connected in the pneumatic brake system of a tractor-trailer unit. The schematic illustration shows how the tractor unit comprises a brake pedal (valve) 2 connected to the control line 4a, and an air compressor and reservoir 50 connected to the supply line 3a. The tractor brake system is known in the art, where e.g. the brake pedal 2 in effect is a pressure regulator valve receiving its working pressure from the on-board air compressor and reservoir.

The figure furthermore indicates how the testing device 1 on one side is connected to the tractor's 22 supply line 3a and control line 4a, and on the other side connected to the trailer's 23 supply line 3c and control line 4c. This is explained in greater detail below. The testing device 1 is mechanically fixed to either the tractor or to the trailer, depending on the circumstances and/or operator preferences.

Figure 1:
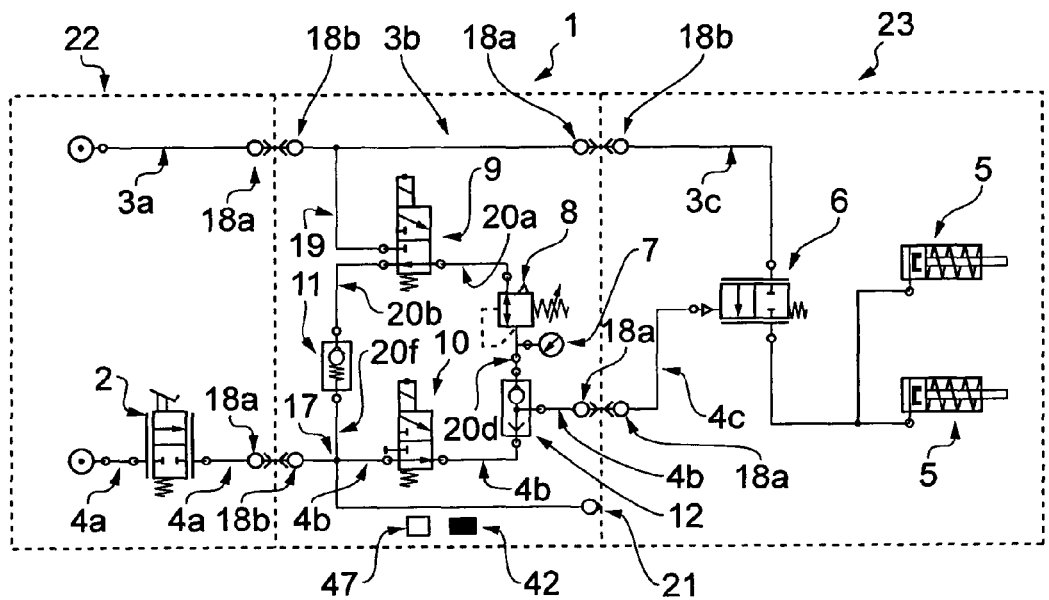
FIG. 1 is a schematic circuit diagram of the invented device, connected in the pneumatic brake lines between a tractor unit and a trailer unit, the device being shown in a neutral, non-activated state, where the brakes of the tractor and trailer may be operated in a normal fashion.

Referring now to FIG. 1, which is a schematic illustration of the invented device, the testing device 1 (indicated by dashed line), is in the illustrated embodiment connected to a supply line 3a on a vehicle, i.e. a heavy vehicle such as the tractor unit 22 (indicated by dashed line in the left-hand side of the figure), via a standard pneumatic connection 18a, 18b. The supply line 3a is connected to a pressurised air supply 50 (shown in FIG. 5), conveniently located on the tractor unit 22, and feeds pressurised air to the device 1 at a working pressure of (typically) 6 to 8 bar. This is a customary working pressure in pneumatic brake systems of heavy vehicles.

The supply line 3a in the tractor is thus fluidly (pneumatically) connected to a supply line 3b in the device 1, where the supply line is interconnected with lines and devices which are described below, and the supply line 3b is further connected to a supply line 3c in the trailer unit 23 (indicated by dashed line in the right-hand side of the figure), via a standard pneumatic connection 18a, 18b. The supply line 3c in the trailer is connected to brake cylinders 5, via a proportional valve 6, in a conventional manner.

The testing device 1 is furthermore fluidly connected to a control line 4a on the tractor unit 22, via a standard a pneumatic connection 18a, 18b. The pressure in the control line is controlled by a brake pedal valve 2 which controls the brakes on the tractor unit and (when connected) trailer, in a conventional manner.

The control line 4a in the tractor is thus fluidly (pneumatically) connected to a control line 4b in the device 1, where it is interconnected with lines and devices which are described below, and the control line 4b is further fluidly connected to a control line 4c in the trailer unit 23, via a standard pneumatic connection 18a, 18b. The control line 4c in the trailer is fluidly connected to brake cylinders 5, via the proportional valve 6, in a conventional manner.

In the testing device 1, the supply line 3b is fluidly connected to the input port of a first solenoid operated valve 9, via a branch line 19. The first valve 9 is connected via a line 20a to a pressure regulator 8, which in turn is connected to a shuttle valve 12 via a line 20d. A pressure gauge (manometer)

7 is connected to the line 20d. The exhaust port of the first valve 9 is also connected to a check valve 11 via a line 20b, and the check valve 11 is connected to the control line 4b at a branch point 17 via a line 20f.

A shuttle valve 12 is connected to the control line 4b and also to the control line 4c in the trailer via the connection 18a. A second solenoid operated valve 10 is fluidly connected to the control line 4b, between the branch point 17 and the shuttle valve 12.

The first valve 9 and the second valve 10 are in the illustrated embodiment so-called momentary (i.e. non-latching) valves. A momentary valve changes state (e.g. from open to close, or vice versa) when its relay receives a control input signal, and returns to its basic (non-activated) state as soon as the control input signal ceases. As the first and second valves 9, 10 in the illustrated embodiment comprise solenoid valves, such control input signal is typically an electrical signal generating a magnetic field which operates the valve's relay.

FIG. 1 illustrates the first valve 9 and second valve 10 in their respective basic (non-activated) states. This is indicated by the spring-like symbol on the valves being shown in a relaxed (as opposed to compressed) state. Reference number 21 denotes a test outlet, to which a manometer with e.g. a drag pointer (not shown) may be connected.

The testing device 1 also comprises a transceiver-control unit 42, capable of receiving and transmitting signals from and to a remote transceiver-control unit 40 (see FIGS. 5 and 6) and also receiving and transmitting signals from and to components within the testing device 1 (e.g. valves, pressure gauge, pressure regulator, sensors, etc.), in a manner which per se is known in the art. The communication between the transceiver-control unit 42 and the components in the testing device 1 may be by means of electrical wiring (not shown) or by wireless means known in the art. The communication between the transceiver-control unit 42 and the remote transceiver-control unit 40 may also be by means of electrical wiring (not shown), but preferably by wireless means known in the art.

Electrical power for the components in the testing device 1 may be taken from the tractor's electrical system or provided by an embedded battery unit. Such sources of electrical power supply, and corresponding wiring, are readily understood by the skilled person and therefore not shown in the figures or explained in more detail.

Figure 6:
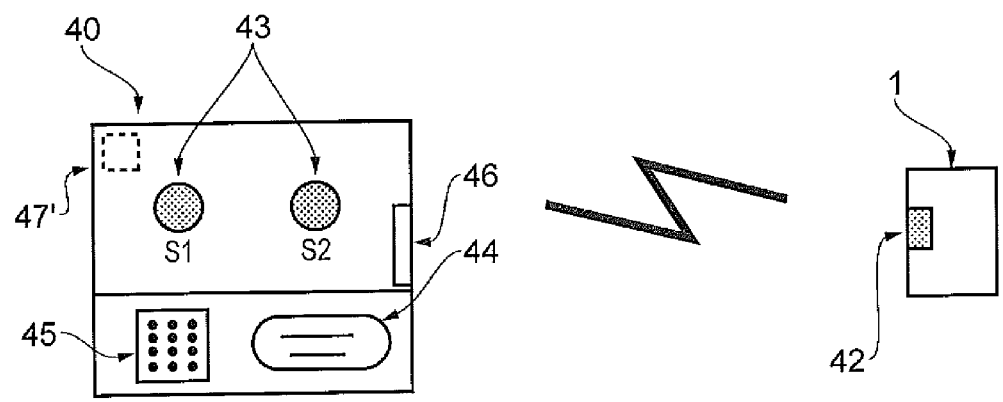
FIG. 6 is a schematic illustration of components facilitating remote operation of the device according to the invention.

The remote transceiver-control unit 40, which is illustrated schematically in FIG. 6, comprises push-buttons 43 for operating the first 9 and second 10 valves in the testing device 1. Optionally, the unit also comprises a keyboard 45 for entering control parameters for the testing device 1, a screen 44 for displaying data and other information, and a data storage medium 46. Depending on the practical application, the push-buttons 43 may be housed in a unit which is separate from the unit housing the keyboard 45, screen 44 and data storage medium 46.

The testing device 1 is thus remotely operable by means of the remote transceiver-control unit 40, and the operator (driver) may thus control the testing device 1 from a location remote from the testing device itself, preferably from the driver's cabin. The driver may thus, single-handedly, control and operate the testing device 1 in a safe and reliable manner while driving the tractor-trailer unit.

The remote transceiver-control unit 40 may be a custom made unit, or may comprise a portable computer (e.g. laptop, PDA) with the appropriate software.

A—Testing Brakes on Tractor 22 and Trailer 23 (First and Second 9, 10 Valves in Non-Activated States)

In the state illustrated in FIG. 1, the first valve 9 and the second valve 10 are in a non-activated state. The first valve 9 allows flow in the circuit 20a, 20b, 20d and 20f but is preventing flow from the supply line 3a,b from entering into the circuit 20a, 20b, 20d and 20f. The second valve 10 allows flow in the control line 4a,b to flow through the device, into the control line 4c on the trailer.

Thus, when the driver operates the brake 2, the pressure by this control input is conveyed in the control lines 4a, 4b, through the open second valve 10 and further into the control line 4c on the trailer, where it operates the trailer brakes 5 in the normal fashion. The pressure exerted in the control line 4b by the brake pedal biases the shuttle valve 12 such that its connection with the circuit line 20d is closed. As the first valve 9 is not activated, supply air is fed in the supply lines 3a-c into the trailer in a normal fashion. This state, illustrated in FIG. 1, therefore corresponds to the normal state of operating the trailer brakes, i.e. corresponding to a state as if the device 1 was not installed at all, as if the supply line 3a in the tractor is connected directly to the supply line 3c in the trailer and the control line 4a in the tractor is connected directly to the control line 4c in the trailer.

The proportional valve 6 is shown in a closed and non-activated state, but the skilled person knows that this proportional valve 6 is activated (and opened) proportionally with the control input provided by the brake pedal 2, and thus applying the desired pressure onto the brake cylinders 5.

B—Testing Tractor 22 Brakes Only (First Valve 9 not Activated, Second Valve 10 Activated; Brake Pedal 2 Activated)

Figure 2:
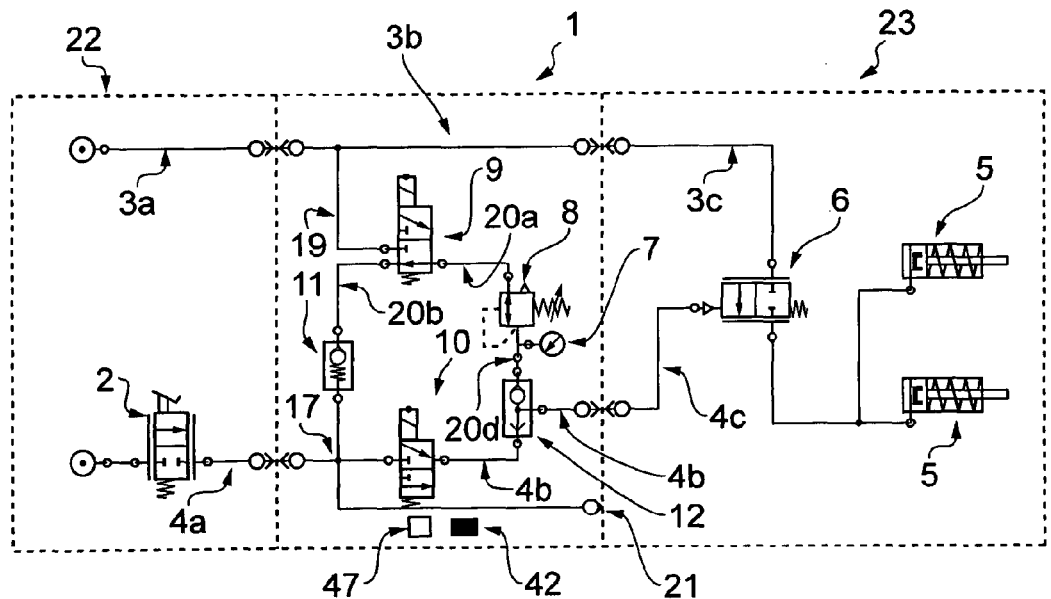
FIG. 2 is a schematic circuit diagram of the device as shown in FIG. 1, but illustrating a state where a first valve is not activated and a second valve is activated.

In FIG. 2, the second valve 10 is activated (and closed), thus blocking the flow path from the control line 4a in the tractor and the control line 4b in the device 1 and consequently the control line 4c in the trailer. The first valve 9 remains in it non-activated state, as described above, leaving the supply lines 3a-c unimpeded.

Therefore, when the driver operates the brake pedal 2 when the second valve 10 is activated, only the brakes in the tractor 22 are operated, while the trailer 23 brakes 5 are not operated (It should be mentioned that the brakes in the tractor 22 are not illustrated, as these are well known by the skilled person, and furthermore not part of the invention).

Therefore, with the test device 1 in the state as illustrated by FIG. 2, a driver may test the braking action on the entire tractor-trailer unit with only the tractor brakes engaged.

The test may be performed while driving, and the solenoid operated second valve 10 is temporarily (momentarily) activated (closed) by the driver pressing the button marked "S1" on the remote transceiver-control unit 40 while also pressing down on the foot brake 2. As soon as the driver releases the "S1" button, the second valve 10 returns to its non-activated state, and the tractor-trailer brake system returns to its unmodified state (as if the testing device was not installed).

C—Testing Trailer 23 Brakes 5 Only (First Valve 9 Activated, Second Valve 10 not Activated; Brake Pedal 2 not Activated)

Figure 3:
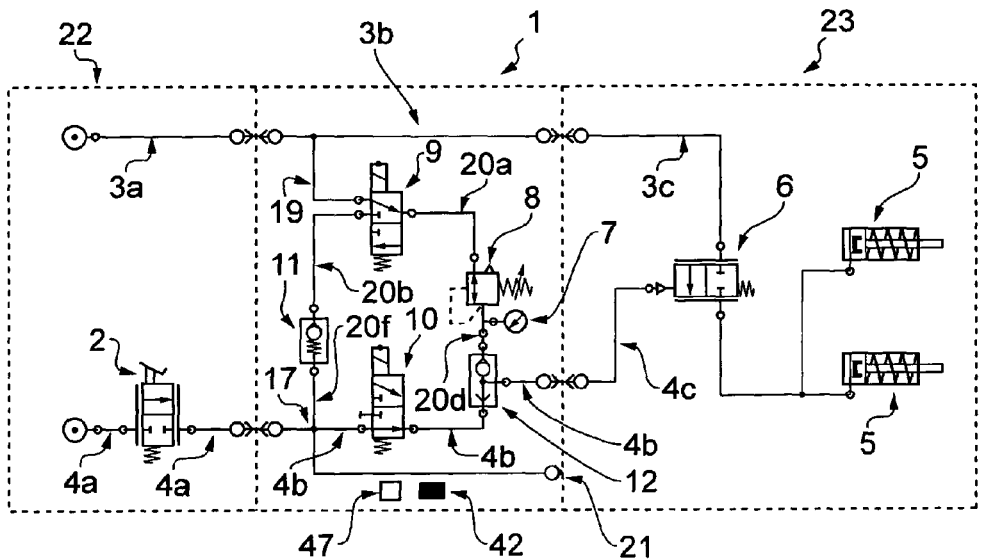
FIG. 3 is a schematic circuit diagram of the device as shown in FIG. 1, but illustrating a state where a first valve is activated and a second valve is not activated.

In FIG. 3, the first valve 9 is activated and opened, allowing fluid flow from the supply line 3a,b into the circuit 20a,d, through the pressure regulator 8 and biasing the shuttle valve 12 such that the control line 4b in the device 1 is blocked, preventing fluid flow from the circuit 20a,d from entering the tractor 22 brake system via the control line 4a. In this state, only the brakes 5 in the trailer 23 are activated, and at a pressure which is pre-set in the pressure regulator 8, lower than the pressure in the supply line (typically 3.5 bar). A pre-setting of the pressure regulator 8 is conveniently performed by the driver via the keyboard 45 on the remote transceiver-control unit 40, or manually on the pressure regulator itself. The second valve 10 is not activated.

Therefore, with the test device 1 in the state as illustrated by FIG. 3, a driver may test the braking action on the entire tractor-trailer unit with only the trailer brakes 5 engaged.

The test may be performed while driving, and the solenoid operated first valve 9 is temporarily (momentarily) activated (opened) by the driver pressing the button marked "S2" on the remote transceiver-control unit 40, without applying the foot brake 5. As soon as the driver releases the "S2" button, the first valve 9 returns to its non-activated state, the air is exhausted through the regular brake exhaust on the trailer, and the tractor-trailer brake system returns to its unmodified state (as if the testing device was not installed).

D—Measurements Performed During Testing

Figure 4:
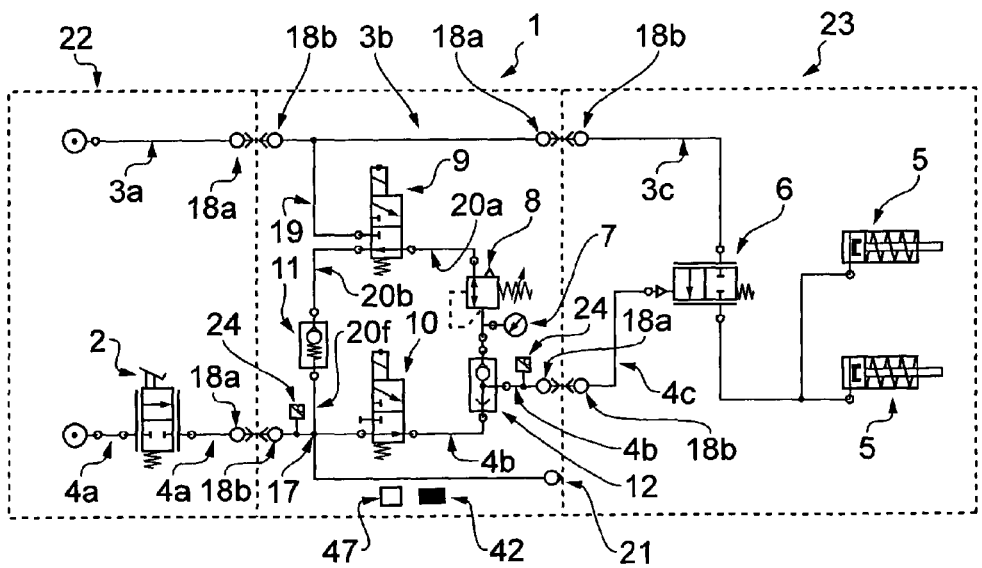
FIG. 4 is a schematic circuit diagram of the device as shown in FIG. 1, illustrating further components.

The brakes of the tractor-trailer unit, individually or combined, may thus be tested by the manipulation of the brake pedal and valves, as described above. Logging equipment, such as accelerometers and pressure sensors, are arranged on the tractor-trailer unit. Preferably, the testing device 1 comprises pressure sensors 24 (see FIG. 4) and an accelerometer 47, both capable of communicating with the remote transceiver-control unit 40. Alternatively or additionally, the remote transceiver-control unit 40 also comprises an accelerometer 47'. Measured data (e.g. g-forces, speed, deceleration, elapsed time, etc.) are recorded and stored in the storage medium 46 and may also be displayed on the screen 44.

Testing may conveniently be performed by the driver setting the pre-determined pressure in the pressure regulator 8, accelerating to a pre-determined speed (commonly a low speed, compared to the normal driving speeds), and then operating the valves 9, 10 and the brake pedal valve 2 as explained above, and recording key data. The recorded deceleration vs. time will for example give a clear indication of the braking power-to-weight ratio.

The method of testing the brakes on the tractor-trailer unit may be summarised as follows:

A. Testing entire brake system; i.e. on tractor 22 and trailer 23 combined:
  a. First valve 9: not activated
  b. Second valve 10: not activated
  c. Brake valve 2: activate in order to provide braking action, optionally until tractor-trailer unit comes to a halt B. Testing tractor 22 brakes only:
  a. First valve 9: not activated
  b. Second valve 10: activated
  c. Brake valve 2: activate in order to provide braking action, optionally until tractor-trailer unit comes to a halt)

C. Testing trailer 23 brakes 5 only:
  a. First valve 9: activated in order to provide braking action, optionally until tractor-trailer unit comes to a halt),
  b. Second valve 10: not activated
  c. Brake valve 2: not activated)

The invention claimed is:

1. A device (1) for testing pneumatically operated brakes of a first vehicle (22) and of a second vehicle (23), said vehicles being connected and having interconnected brake systems, characterized by a device supply line (3b) and a device control line (4b) for connection to respective corresponding supply and control lines (3a, 3c, 4a, 4c) in the vehicles such that the device (1) is fluidly connected into and between the brake system of the first vehicle (22) and the brake system of the second vehicle (23);

a first valve means (9) operable for temporarily and releasably connecting the device supply line (3b) to the device control line (4b), whereby braking action is effected on the second vehicle (23) via a second vehicle control line (4c), independently of the braking action on the first vehicle (22); and a second valve means (10) operable for temporarily and releasably blocking the device control line (4b), whereby braking action is effected on the first vehicle (22) without effecting braking action on the second vehicle (23).

2. The device of claim 1, further comprising a shuttle valve (12) for connecting the device supply line (3b) to the device control line (4b) and closing the device control line (4b) off from the first vehicle (22) control line (4a), when the first valve means (9) is operated, in order to prevent fluid flowing through the first valve means (9) from entering the tractor (22) brake system.

3. The device of claim 1, further comprising pressure control means (8) fluidly connected (20a, 20d) between the first valve means (9) and the device control line (4b), whereby a braking pressure is set at a pre-determined level before operating the first valve means (9).

4. The device of claim 3, further comprising pressure gauge (7) fluidly connected between the pressure control means (8) and the shuttle valve (12).

5. The device according to claim 1, further comprising a transceiver-control unit (42) for operating parts and equipment within the device, said transceiver-control unit (42) being configured to communicate with a remote control unit (40), whereby the device (1) is controlled by means of the remote control unit (40).

6. The device of claim 5, wherein the remote control unit (40) comprises valve control buttons (43), a data processor, data input means (45), data display means (44) and a data storage medium (46).

7. The device according to claim 1, wherein the supply line (3a) is fluidly connected to a pressurised reservoir (50) in the first vehicle (22), and the control line (4a) is connected to a brake valve (2) in the first vehicle (22).

8. A method of activating the brakes (5) of a trailer unit (23) which is connected to a tractor unit (22), without activating the brakes of the tractor unit (22), and by means of the device (1) of any one of claims 1-7, characterized by activating the first valve means (9) in order to provide braking action.

9. The method of claim 8, wherein the first valve means (9) is remotely (40, 42) activated by the driver of the tractor unit (22) while the tractor-trailer unit (22, 23) is driving on a roadway.

10. The method of claim 8, wherein the first valve means (9) is activated until the tractor-trailer unit (22, 23) comes to a halt.

11. The method of claim 8, wherein the second valve means (10) and the tractor foot brake valve (2) are not activated.

12. A method of activating the brakes of a tractor unit (22) which is connected to a trailer unit (23), without activating the brakes of the trailer unit (23), by means of the device (1) of any one of claims 1-7, characterized by blocking the device control line (4b) by activating the second valve means (10) and also activating the tractor foot brake valve (2) in order to provide braking action.

13. The method of claim 12, wherein the second valve means (10) is remotely (40, 42) activated by the driver of the tractor unit (22) while the tractor-trailer unit (22, 23) is driving on a roadway.

14. The method of claim 12, wherein the second valve means (10) is activated until the tractor-trailer unit (22, 23) comes to a halt.

15. The method of claim 12, wherein the first valve means (9) is not activated.

* * * * *